(12) United States Patent
Clevenger

(10) Patent No.: US 9,357,264 B2
(45) Date of Patent: May 31, 2016

(54) METHOD AND APPARATUS FOR PROCESSING REQUESTS FOR RECORDING CONTENT

(71) Applicant: THOMSON LICENSING, Issy de Moulineaux (FR)

(72) Inventor: Brian Duane Clevenger, Muncie, IN (US)

(73) Assignee: Thomson Licensing, Issy les Moulineaux (FR)

( * ) Notice: Subject to any disclaimer, the term of this patent is extended or adjusted under 35 U.S.C. 154(b) by 77 days.

(21) Appl. No.: 14/344,597

(22) PCT Filed: Sep. 20, 2012

(86) PCT No.: PCT/US2012/056257
§ 371 (c)(1),
(2) Date: Mar. 12, 2014

(87) PCT Pub. No.: WO2013/043821
PCT Pub. Date: Mar. 28, 2013

(65) Prior Publication Data
US 2015/0016803 A1    Jan. 15, 2015

Related U.S. Application Data

(60) Provisional application No. 61/537,619, filed on Sep. 22, 2011.

(51) Int. Cl.
*H04N 5/76* (2006.01)
*H04N 21/458* (2011.01)
*H04N 9/79* (2006.01)
*H04N 21/4147* (2011.01)
*H04N 21/433* (2011.01)
*H04N 21/4335* (2011.01)
*H04N 21/475* (2011.01)

(52) U.S. Cl.
CPC ............. *H04N 21/4583* (2013.01); *H04N 9/79* (2013.01); *H04N 21/4147* (2013.01); *H04N 21/4334* (2013.01); *H04N 21/4335* (2013.01); *H04N 21/4755* (2013.01)

(58) Field of Classification Search
CPC ...................................................... H04N 5/76
USPC ......... 386/291, 292, 293, 294, 295, 296, 297, 386/298, 299
See application file for complete search history.

(56) References Cited

U.S. PATENT DOCUMENTS 7,665,111 B1    2/2010    Barton et al.
7,774,816 B2    8/2010    Bumgardner et al.
(Continued)

OTHER PUBLICATIONS

Saheb: Efficient Algorithm for Overlap-Join. Information Technology Journal 10 (1) pp. 201-206, 2011.

*Primary Examiner* — Daquan Zhao
(74) *Attorney, Agent, or Firm* — Robert D. Shedd; Lily Neff

(57) ABSTRACT

A method and apparatus are disclosed for processing content recording requests. The method includes producing a prioritized set of recording requests from all pending recording requests, analyzing the prioritized set of requests with respect to available resources, and producing a list of content requests to be excluded from a recording schedule due to resource constraints. Content recording is performed based on results of the analysis.

15 Claims, 5 Drawing Sheets

(56) References Cited

U.S. PATENT DOCUMENTS

| | | |
|---|---|---|
| 7,877,768 B2 | 1/2011 | Beach et al. |
| 2002/0004734 A1* | 1/2002 | Nishizawa ................. 705/9 |
| 2003/0198462 A1 | 10/2003 | Bumgardner et al. |
| 2006/0127038 A1* | 6/2006 | Kwon ............................. 386/83 |
| 2007/0230903 A1* | 10/2007 | Sakatani et al. ................ 386/92 |
| 2008/0196065 A1 | 8/2008 | Cheng et al. |
| 2009/0142036 A1* | 6/2009 | Branam et al. .................. 386/83 |
| 2010/0158476 A1 | 6/2010 | Hao et al. |

* cited by examiner

METHOD AND APPARATUS FOR PROCESSING REQUESTS FOR RECORDING CONTENT

CROSS-REFERENCE TO RELATED APPLICATIONS

This application claims the benefit, under 35 U.S.C. §365 of International Application PCT/US2012/056257 filed Sep. 20, 2012 which was published in accordance with PCT Article 21(2) on Mar. 28, 2013 in English, and which claims the benefit of U.S. provisional patent application No. 61/537,619 filed Sep. 22, 2011.

TECHNICAL FIELD

This invention relates to a method and apparatus for processing requests for recording content, and specifically, for processing requests for recording content or programs with time and/or resource conflicts.

BACKGROUND

Providers of media content, such as cable television and satellite television, now offer their subscribers the ability to record content for later playback. Such recording typically occurs by way of a recording device, such as a disk drive, located within or external to, a set-top box or other content selection device at the customer premises. Alternatively, such recording can occur by way of a recording device within the media content provider's network, which conceivably spans multiple networks operated by multiple media content providers. To simplify the discussion, the term "Digital Video Recorder" or "DVR" will hereinafter refer to such a recording device, irrespective of whether it is located on the customer premise or within the network of the media content provider.

When a subscriber schedules recordings of content on a DVR, the recordings may overlap in time causing a potential recording conflict. Various factors can complicate the resolution of these potential recording conflicts. Thus, a need exists for a technique for processing recording requests with program time overlaps subject to resource constraints.

SUMMARY OF THE INVENTION

Embodiments of the present principles provide a method and apparatus for processing content recording requests by analyzing a prioritized reduced set of requests and resolving conflicts in the recording requests. Another embodiment provides a computer readable medium containing instructions that, when executed, causes a method to be performed for processing content recording requests.

One embodiment provides a method for processing requests for content recording, which includes: providing a prioritized reduced set of recording requests from a total number of pending recording requests, in which each recording request in the prioritized reduced set has a time overlap with at least one other recording request in the prioritized reduced set, and the prioritized reduced set has fewer recording requests than the total number of pending recording requests. The method includes analyzing the prioritized set with respect to resource constraints to identify recording requests to be excluded from a recording schedule, scheduling requests for recording based on results of the analysis; and recording content according to scheduled requests.

Another embodiment provides a video recorder, which includes an input stream processor; a controller coupled to the input stream processor; and a storage device coupled to the controller. The controller is configured for receiving recording requests, producing a prioritized set of overlapping recording requests from all pending recording requests, and analyzing the prioritized set with respect to available resources; and, based on analysis results, identifying recording requests to be excluded from a recording schedule.

Yet another embodiment provides a non-transitory computer readable medium comprising instructions that, when executed by a processor, causes a process to be performed. The process includes: providing a prioritized reduced set of recording requests from all pending recording requests, each recording request in the prioritized set having a time overlap with at least one other recording request; analyzing the prioritized reduced set with respect to available resources to identify recording requests to be excluded from a recording schedule; scheduling requests for recording based on results of the analysis; and recording content according to scheduled requests.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures. The drawings are not to scale, and one or more features may be expanded or reduced for clarity.

DETAILED DESCRIPTION

Figure 1:
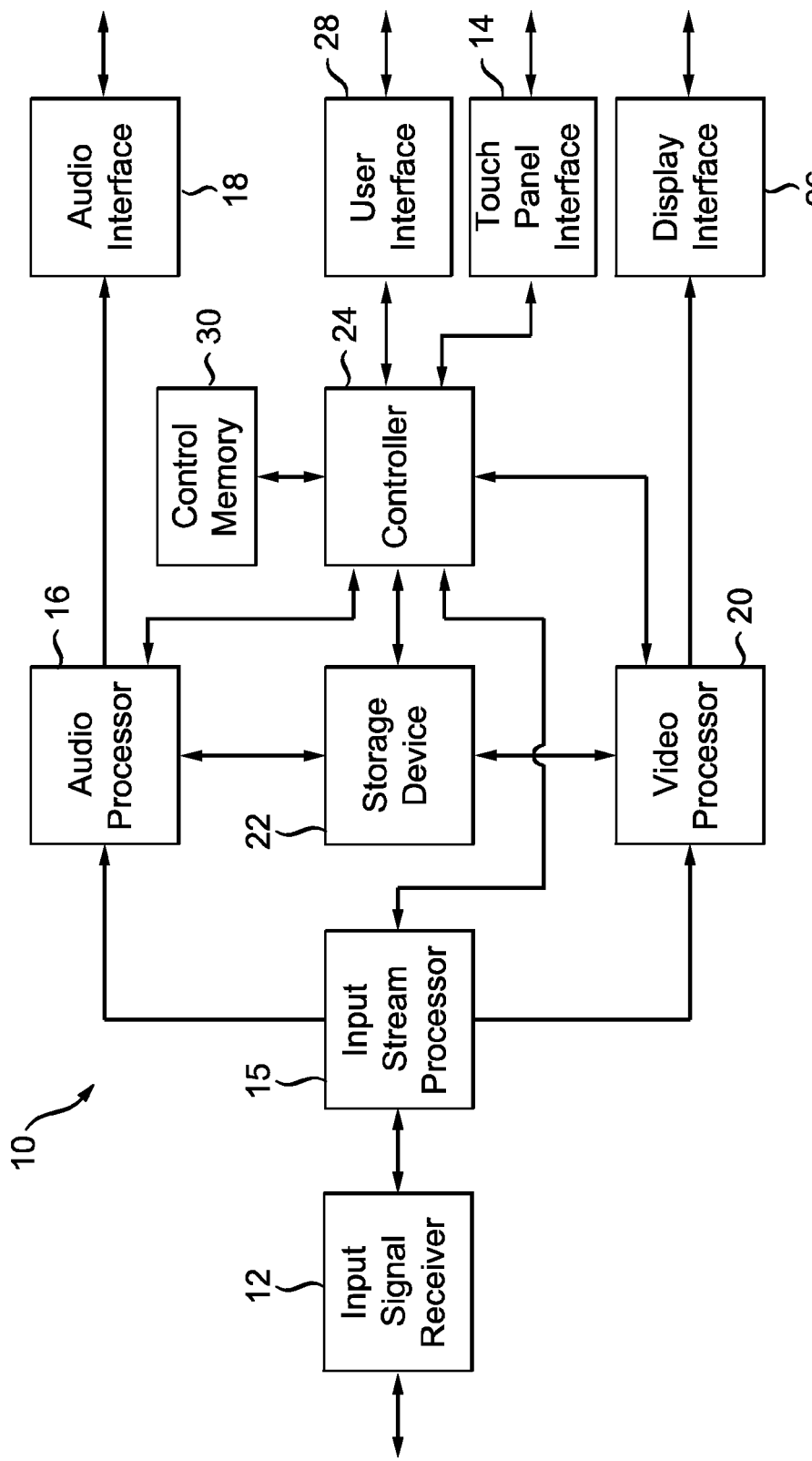
FIG. 1 illustrates a block schematic diagram of a content selection device suitable for implementing a method of the present invention.

FIG. 1 depicts a block schematic diagram of an exemplary content selection device 10, hereinafter referred to as a set-top box (STB), configured for processing recording requests with program time overlaps and resource constraints according to a method of the present invention, and subsequently recording content based on a schedule of processed requests. In one embodiment, the set-top box 10 of FIG. 1 includes the DVR as described above. However, other configurations for the set-top box 10 and DVR may also be used. For example, the functionalities may be located in separate "boxes" or units at a customer premise, as parts of a Local or Wide area network or located in a Cloud or internet.

The set-top box 10 of FIG. 1 includes an input signal receiver 12. The input signal receiver 12 can comprise one of several known receiver circuits used for receiving, demodulating, and decoding signals received from one of several possible networks including over the air, cable, satellite, Ethernet, fiber, phone line networks, and so on. Selection of a desired input signal for retrieval by the input signal receiver 12 may occur, for example, in accordance with user input provided through a control interface or touch panel interface 14. Touch panel interface 14 can include an interface for a touch screen device. Touch panel interface 14 can also include an interface to a cellular phone, a tablet, a mouse, or a remote control (not shown), or the like. One ordinarily skilled in the art also recognizes selection may occur by with other techniques such as signal availability, time selection, and so on.

The input receiver 12 provides a decoded output signal to an input stream processor 15. The input stream processor 15 performs the final signal selection and processing, and serves to separate video content from audio content for the content stream. An audio processor 16 converts the audio from the received format, such as compressed digital signal, to an analog signal. An audio interface 18 receives the analog audio and distributes the audio to a display device (not shown) or audio amplifier. Alternatively, the audio interface 18 can provide a digital signal to an audio output device (not shown) or to the display device using a High-Definition Multimedia Interface (HDMI) cable or alternate audio interface such as via a Sony/Philips Digital Interconnect Format (SPDIF). The audio interface 18 can also include amplifiers (not shown) for driving one more sets of speakers. The audio processor 16 also performs any necessary conversion for the storage of the audio signals.

A video processor 20 receives the video from the input stream processor 15. The video signal can have one or more formats. The video processor 20 converts the video content, as necessary, based on the input signal format. The video processor 20 also performs any necessary conversion for the storage of the video signals.

A storage device 22 can store input audio and video content. The storage device 22 allows later retrieval and playback of the content under the control of a controller 24 and also based on commands, e.g., navigation instructions such as fast-forward (FF) and rewind (RW), received from a user interface 28 and/or the touch panel interface 14. As non-limiting examples, the storage device 22 can comprise a hard disk drive, one or more large capacity integrated electronic memories, such as static RAM (SRAM), or dynamic RAM (DRAM), or may be an interchangeable optical disk storage system such as a compact disk (CD) drive or digital video disk (DVD) drive.

The converted video signal from the video processor 20 can originate from either the input stream processor 15 or from the storage device 22. The video processor 20 provides the converted video to the display interface 26. The display interface 26 further provides the display signal to a display device of the type described above. In an example embodiment the display interface 26 can comprise an analog signal interface such as red-green-blue (RGB) or a digital interface such as HDMI.

In one example, the bus links the controller 24 to several of the components of the set-top box 10, including the input stream processor 15, audio processor 16, video processor 20, storage device 22, and a user interface 28. The controller 24 performs various functions, including managing the conversion process for converting the input stream signal into a signal for storage on the storage device 22 or for display, as well as managing the retrieval and playback of stored content. Furthermore, as will be described below, the controller 24 processes requests for recording media content with program time overlaps, and schedule recordings subject to resource constraints.

The controller 24 has access to a control memory 30 (e.g., volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 24. The control memory 30 can include several possible embodiments, such as a single memory device or, alternatively, more than one memory circuit communicatively connected or coupled together to form a shared or common memory.

To program the set-top box 10 to record content, a user enters commands via the user interface 28 or through the touch panel interface 14 to request the recording of content. For example, a user may be located at a restaurant and program the set-top box 10 to record content via a cell phone. Various alternative methods may also be used to program the recording of content, such as user preferences or viewing habits, where there is no direct user interaction in programing the content to be recorded.

In one embodiment, the user will enter priorities for the content to be recorded. In an alternative embodiment, the content to be recorded may be automatically prioritized according to user preferences, viewing habits, or the like.

When, for example, a user enters commands via the user interface 28 or through the touch panel interface 14 to record selected content, the recording requests can overlap in time (i.e., the requested programs have time overlaps). However, simply because two recording requests overlap in their program times does not necessarily prevent execution of both requests. For example, depending on user priorities and/or resource constraints, two recording requests may have program time overlap, but may not actually conflict so as to preclude satisfying both requests. In other words, program time overlap in recording requests alone is not determinative of whether a true conflict exists.

The controller 24 is configured to process recording requests according to different criteria or rules applicable to various situations. In one situation, the controller 24 determines which recording request to execute by examining the recording requests with program time overlap and identifying those overlapping requests for which no true conflict exists. For example, two recordings on the same service and/or channel could overlap in time but not give rise to an actual conflict because the same resource can be used for both recordings. In this discussion, a true or actual conflict refers to a situation in which two or more requested recordings would require the same system resource within a same time period, and there is insufficient resource to fulfill or satisfy at least one of the requests. A recording request refers to a request for content or program, which is made available on a given channel providing a specific service. A service can be defined by a program (content) and a channel for broadcasting the program. The channel and/or program has certain parameters or characteristics associated with the program broadcast, e.g., program time, data format (SD, HD, 2D, 3D), among others.

To illustrate, assume a request to record two back to back programs on the same channel; with the first recording set to end five minutes late and the second recording set to begin five minutes early. This would create a 10 minute overlap in the two requests, but the overlap would not require additional resources and would not result in a true conflict, because both requests can be satisfied by a single tuner to record the entire time period covering both requests.

In another scenario, the controller 24 determines which recording request to execute by examining the overlapping recording requests (i.e., requests for which the programs overlap in time) and resolving conflicts among those overlapping requests by taking into account the priorities of the content to be recorded (or priorities associated with the requests). For example, recording requests with the lowest priority will not undergo execution when an actual conflict exists, i.e. when there is insufficient resource to record all requested programs within a given time period.

In yet another scenario, the controller 24 takes into account resource constraints of, for example, the set-top box 10, the DVR, the media content provider or any combination thereof. Resource constraints can involve more than simply limiting recording to a certain number of simultaneous recordings. For example, a set-top box 10 (with a DVR) may contain two cable and two ATSC tuners. With the set-top box 10 configured in this manner, scheduling three recordings that all require cable tuners at the same time would result in a conflict. In contrast, scheduling three recordings that require two cable tuners and an ATSC tuner would not give rise to a conflict. In another example, use of a hardware demultiplexer may be required to parse data during recording for storing indexing data. In this case, if only 4 hardware demultiplexers are available, a limitation would exist of a maximum of 4 simultaneous recordings regardless of tuner availability. In this embodiment, the number of recording requests with program time overlap, together with the type and availability of resources required for each request, are considered in processing the requests and resolving conflicts in these requests.

In another example, for an IPTV network with limited bandwidth, the bitrate of each service provider of the content requested for recording is considered. For example, 25 MB/s link is available and 10 MB/s for each HD channel and 5 MB/s for each SD channel are required. In this case, the sum of channels should not exceed 25 MB/s. This means that the bandwidth would allow recording of at most two HD channels, or up to five SD channels. A mix of channels may also be recorded, for example, one HD channel and three SD channels at the same time. Thus, in resolving potential conflicts for the overlapping recording requests, a low bitrate SD channels may be recorded rather than a higher bitrate HD channels, or a combination of SD and HD channels can be recorded in order to maximize the use of available resources.

The controller 24 of FIG. 1 will use various parameters or factors in processing recording requests with time overlap in the requested programs, and to determine whether or not there is an actual conflict by taking into account resource constraints as well as assigned priorities when resolving conflicts in the recording requests. Thus, global constraints, i.e., constraints in the recording system that are not specific to any event or service, can also limit the maximum number of recordings due to input/output (I/O) constraints or other resource limitations. Such constraints may include, for example, the capacity limit for downstream throughput of a network interface, or the recording speed of a file system.

Figure 2:
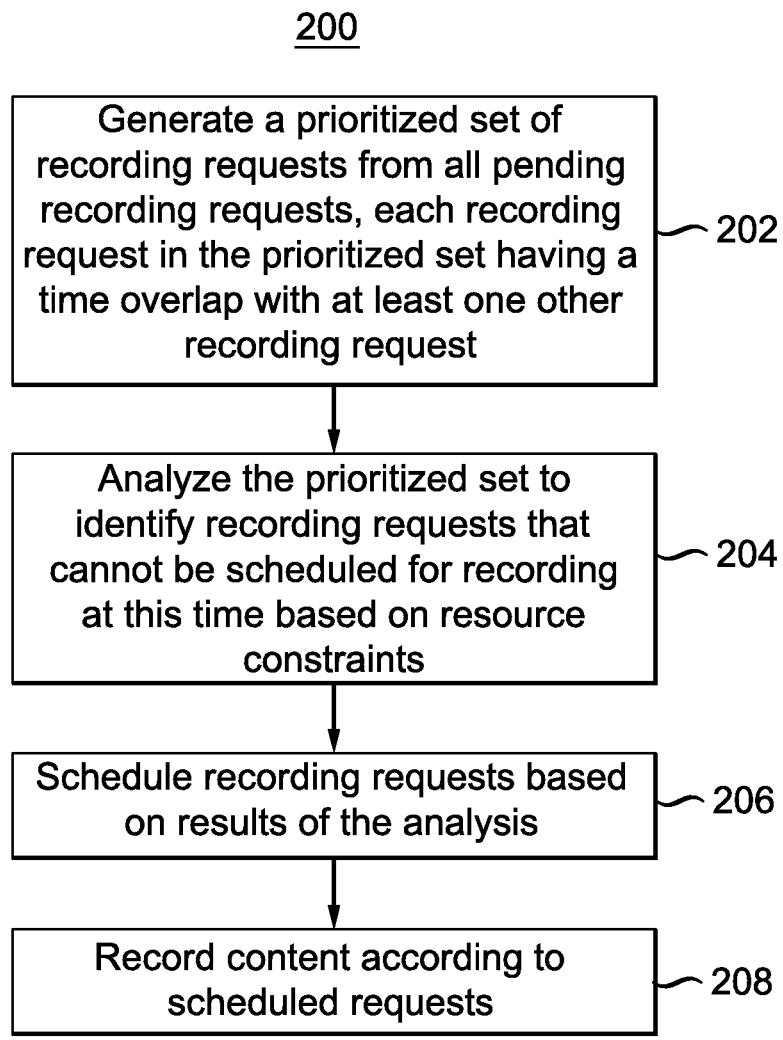
FIG. 2 illustrates a method of processing content recording requests according to principles of the present invention.

FIG. 2 illustrates a method 200 for processing recording requests with program time overlaps subject to resource constraints. As shown in block 202, a prioritized data set or list of requests is generated from a total number of pending recording requests (i.e., from all requests waiting to be scheduled for recording). Each request with a program time that overlaps with at least one other program in another request will be included in the prioritized set. Any requests that do not have program time overlap (i.e., no time conflicts) with any other request can be scheduled for recording, and are excluded from the prioritized set. In this case, the prioritized set will only be a subset of the pending requests. This prioritized set with less than the total number of pending requests is also referred to as a reduced data set. If each pending request has a program time overlap with at least one other request, then the prioritized set will include all pending requests. In this unusual situation, embodiments of the present invention will not provide any time-saving benefits compared to other known or conventional approaches.

In block 204, each request in the prioritized data set is analyzed or evaluated with respect to available resources to identify those requests that should be excluded from a recording schedule. In other words, these are requests that cannot, at this time, be scheduled for recording due to various constraints, including availability of resources such as hardware components, bandwidth, and/or service-related constraints such as rules of operation from service providers. In one implementation, a "do not schedule" list can be created to include all such requests. This "do not schedule" list is re-computed every time that a schedule change is made, e.g., if a new recording request is received, or if an existing recording request is changed or cancelled.

In block 206, requests are processed or scheduled for recording based on results of the analysis from block 204. For example, any requests that are not on the "do not schedule" list can be scheduled for recording. Optionally, a recording schedule can be established for those requests that can be satisfied within the requested time.

In block 208, content or programs are recorded according to the scheduled requests from block 206.

Figure 3:
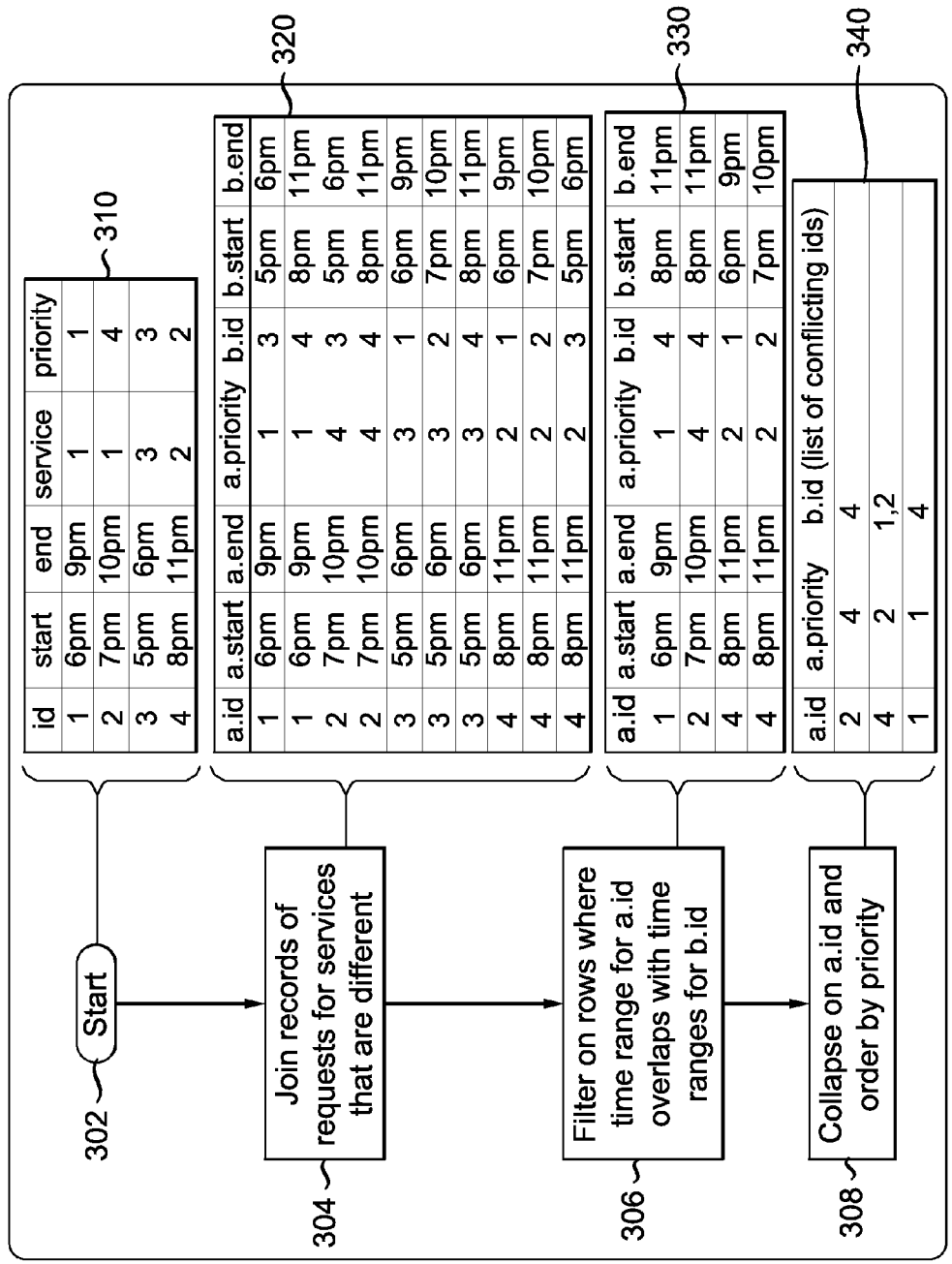
FIG. 3 illustrates a process for generating a prioritized set of recording requests.
Figure 4:
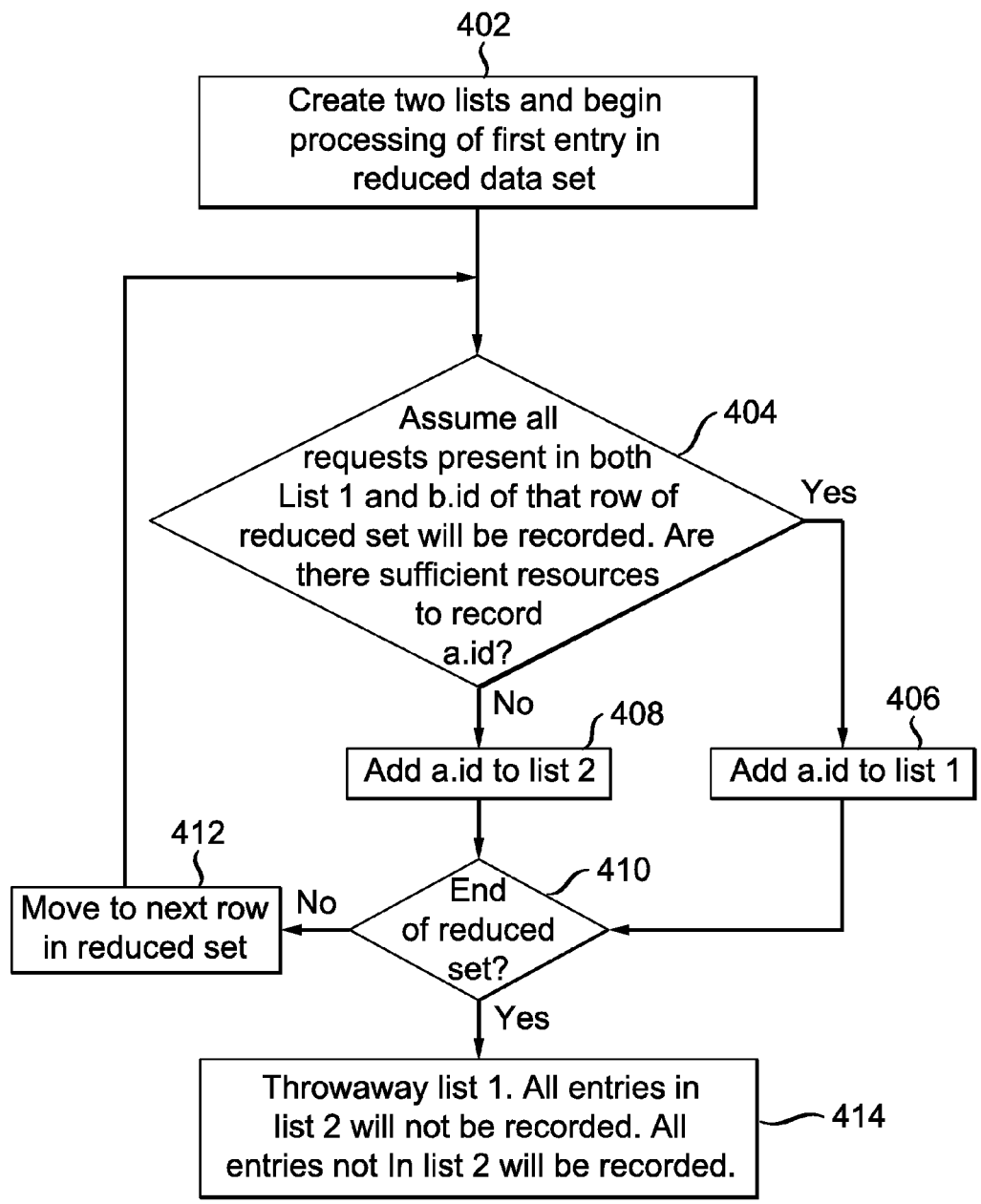
FIG. 4 illustrates a process for identifying requests to schedule for recording.

FIGS. 3-4 illustrate an example of processing recording requests, including resolving potential or actual conflicts, using the approach of FIG. 2. FIG. 3 shows a process 300, corresponding to block 202 of FIG. 2, for generating a prioritized and reduced data set 340 of recording requests from an initial data set 310 that includes all recording requests at a given time. The prioritized and reduced data set 340, which includes all requests having a time overlap with at least one other request, and whose services are different from each other, will be analyzed using process 400 in FIG. 4 (corresponding to block 204 of FIG. 2) to determine if they can be scheduled for recording. This set of data is allowed some error, which may result in extra data in the set to be evaluated, but should not exclude data that need to be evaluated for potential conflicts.

In the example of FIG. 3, a single database query can be used to provide an initial data set containing all pending recording requests, and a "join" process is used to generate a prioritized and reduced data set. Advantageously, a single database query minimizes the number of database accesses, and can significantly speed up the time required to complete a global conflict resolution. Thus, an appropriate SQL® (Structured Query Language) query can be used to generate a data set of all pending recording requests from a database.

In this example, the reduced data set 340 is obtained by joining the initial data set 310 with itself, subject to the constraint that entries requesting different services with an overlap in time will be joined. Depending on specific situations, other approaches can also be used for generating the reduced data set 340. As an example, assume that a system only allows scheduling to occur for a given time interval, e.g., a 5-minute block, and a data set is stored in memory with the events or services scheduled for recording during each 5-minute block. If such a data structure is already in place for another purpose, it might be easier to simply iterate the in-memory data set to identify blocks containing more than one event, and to generate a reduced data set using an operation that is different from the database join operation discussed above.

Block 302 shows a table or database entries 310 that includes an identifier (id) for each recording request; a start and end time associated with the recording request; a service identifier; and a priority of the requested content recording. The service identifier is used to identify various parameters associated with a requested program, including, for example, a channel, one or more attributes or characteristics such as recording formats, content provider or content source.

At block 304, a join operation is performed on the records shown in table 310 such that requests for recording with different services are joined with each other. This example assumes that there are two different services "a" and "b" (e.g., with different channels, content providers, and so on), although more services could exist. At block 302, recording requests in the table for which the services are different are joined, e.g., with additional entries added to table 310 to form another table 320.

To better illustrate the join operation of table 210 with itself, two copies of table 310 are presented below as Table A and Table B.

TABLE B

| ID | Start | End | Service | Priority |
|----|-------|-----|---------|----------|
| 1 | 6 pm | 9 pm | 1 | 1 |
| 2 | 7 pm | 10 pm | 1 | 4 |
| 3 | 5 pm | 6 pm | 3 | 3 |
| 4 | 8 pm | 11 pm | 2 | 2 |

TABLE A

| ID | Start | End | Service | Priority |
|----|-------|-----|---------|----------|
| 1 | 6 pm | 9 pm | 1 | 1 |
| 2 | 7 pm | 10 pm | 1 | 4 |
| 3 | 5 pm | 6 pm | 3 | 3 |
| 4 | 8 pm | 11 pm | 2 | 2 |

In this join operation, each record in Table A is joined with a record in Table B for which the services are different. Thus, the first row or record in Table A (ID=1 and service designation "1") is joined with the third and fourth rows in Table B (with service designations "3" and "2", respectively). Similarly, the second row in Table A is joined with the third and fourth rows in Table B because the service for this row in Table A is different from the services of rows 3-4 in Table B. The third row in A (with service designation "3") is joined with rows 1 and 2 in Table B (with service designation "1"), and so on. The result is table 320 shown in FIG. 3, where each parameter is shown with prefix "a" or "b" to distinguish between the two groups of requests from Tables A and B respectively.

After joining the records for the two groups of requests with different services, the lists of requests undergo filtering at block 306 to yield a reduced set of overlapping recording requests, which is shown in table 330. Specifically, the reduced set includes only requests for which there is a time overlap between request "a" and request "b". Other rows in table 320 for which there is no time conflict between requests "a" and "b" are excluded in table 330 because these requests can be fulfilled. At block 308, the reduced set of overlapping recording requests is ordered by priority, e.g., in decreasing order of priority, as shown in table 340, with "4" being the highest priority. The process for determining which "a.id" recordings will be fulfilled is discussed below.

FIG. 4 illustrates a process 400 to be applied to the prioritized, reduced data set 340 to determine which requests cannot be scheduled for recording. This process can be performed by the controller 24 of FIG. 1.

At block 402, two empty lists or groups (List 1 and List 2) are created, and processing begins with the first entry in the prioritized reduced data set 340 of overlapping requests. In subsequent steps, List 1 will be populated with recording requests for which no actual conflict exists (i.e., resource is available for this request) notwithstanding a time overlap, and thus, can be scheduled for recording. List 2 will be populated with requests that cannot be scheduled for recording due to actual conflicts, e.g., insufficient resource in the requested time period.

At block 404, the first entry in the prioritized, reduced data set 340 is examined, e.g., by controller 24 of FIG. 1, to determine if sufficient resources exist to execute the recording request identified by a.id. This determination is done by assuming that all requests present in both the b.id column of the first entry and List 1 (i.e., intersection of the data sets defined by b.id and List 1) will be recorded, and thus, will have resources allocated to these recordings. Note that these are requests that have a time overlap with the "aid" request (shown in b.id column), but have already been scheduled for recording (shown by its presence in List 1). Considering the resources allocated to these scheduled requests, if there is still sufficient resource to record the current entry in the reduced data set, the request identified by "a.id" will be added to List 1, as shown in block 406. If there is insufficient resource, the recording request will not be scheduled at this time for recording, and is added to List 2 instead, as shown in block 408.

Using the data set 340 as an example, when the first row is evaluated, List 1 will be empty and b.id contains event or program 4. Since there are no events that are present in both List 1 and b.id, this means that no other events will be recorded during the program time of the requested event 2 (under a.id). An inquiry is made to determine if there are sufficient resources to record event 2. Since the answer is yes, event 2 is added to List 1.

In the following round of evaluation, the second row of data set 340 is examined. List 1 now contains event 2, and bid contains events 1 and 2. Since event 2 is present in both bid and List 1, event 2 will be recorded. An inquiry is made to determine, given the resources required for event 2, whether there will be sufficient resource to record event 4 (under aid). If so, event 4 will be added to List 1. Otherwise, it will be added to List 2.

At block 410, an inquiry is made as to whether the end of the prioritized and reduced list of requests has been reached, e.g., whether the current "a.id" entry is the last row in table 340. If not, the process goes to block 412 in which the next row in the reduced list of requests is selected for processing in block 404 as discussed above.

The process of examining each entry in prioritized reduced data set 340 continues until all entries have been examined as determined at block 410. At block 414, List 2 will be a complete list of recording requests that will not be recorded, e.g., to be excluded from a recording schedule. All other requests not in List 2 are to be scheduled for recording. Based on this information, recording requests that are free of actual conflicts (in time and necessary resource) can be scheduled for recording by the recording device. Since List 1 is only a partial list of requests to be recorded (e.g., other requests absent in the reduced set 340 will be scheduled for recordings because there are no time conflicts), it can be discarded at this stage.

In practice, the process 200 of FIG. 2 is performed whenever a new request is received, i.e., whether to record a new program or to update or change an existing scheduled recording (e.g., any change in the time of recording, program, channel, recording format, and other recording-related parameters). Each time that the process 200 is triggered, the entire set of pending requests will be examined, including requests that have previously been excluded for scheduled recordings due to program time overlap and resource constraints. This method has various advantages over other possible alternatives or prior art approaches, as explained below with reference to FIGS. 5-6.

Figure 5:
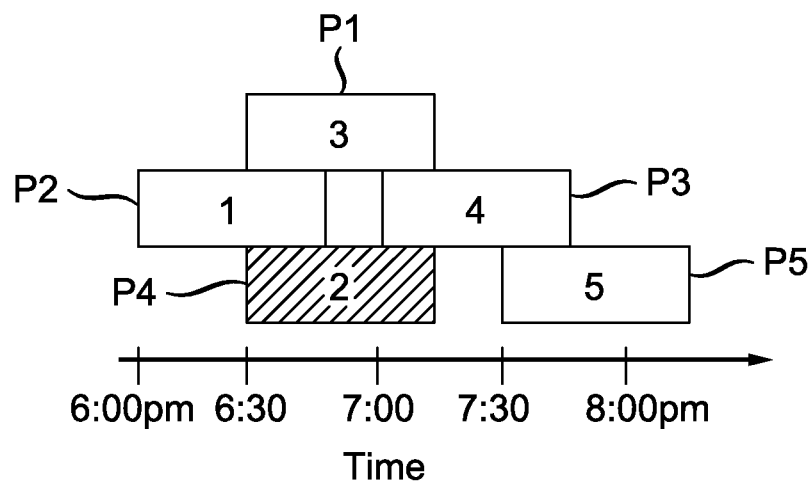
FIGS. 5-6 illustrate two scenarios of recording requests with program time and resource conflicts.

FIG. 5 illustrates recording requests involving five television programs P1-P5, with various time overlaps between 6 pm and 8 pm. The programs P1-P5 are also labeled with their respective priorities 1 through 5, with 1 being the lowest priority, and 5 being the highest priority. Assuming that a set-top box with DVR has two tuners and thus can record two programs simultaneously, the two programs with the highest priorities, i.e., program P5 and P3, are selected or scheduled to be recorded. However, program P4 (having a priority of 2) will not be recorded because it conflicts with programs P1 and P3, both of which are scheduled for recording because of having higher priorities than program P4. On the other hand, since program P2 overlaps in time with only one program request (P1), it can be scheduled for recording (using a second tuner) despite having the lowest priority.

Figure 6:
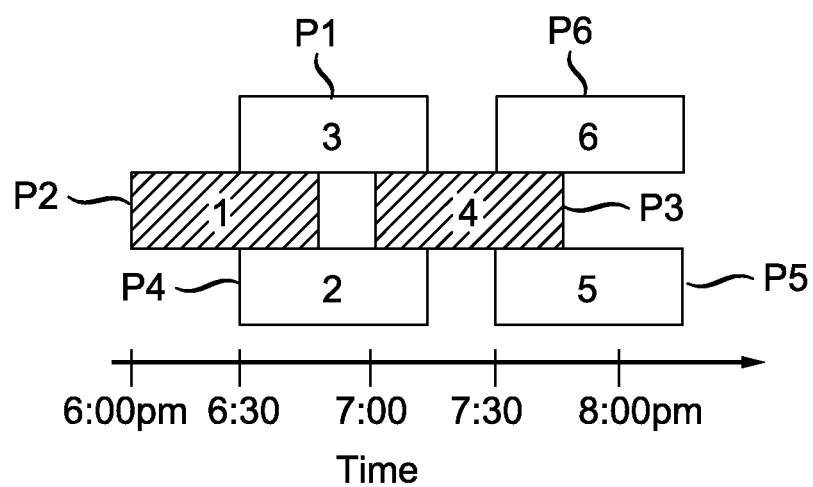

FIG. 6 shows the same programs P1-P5 as in FIG. 5 being requested, and an additional request for program P6 with a priority 6 (i.e., the highest priority among the requested programs) and having time overlaps with programs P3 and P5. In this case, programs P5 and P6 have the highest priorities and are scheduled for recording. However, unlike the scenario in FIG. 5, program P3 will no longer be scheduled for recording because both tuners will be used for programs P5 and P6. Scheduled recordings for programs P1, P2 and P4 are also different from FIG. 5, because both programs P1 and P4 will now be scheduled for recording by virtue of their higher priorities compared to P2.

Thus, FIGS. 5-6 show that an addition of a single new recording request can result in changes that cascade through the entire schedule. In other words, resolving conflicts is not as simple as examining only the time range covered by the new recording request. Instead, the entire schedule of recording requests may have to be evaluated based on program times, priorities and resource constraints.

Although other approaches can also be used to solve this conflict resolution problem, the method and example discussed in FIGS. 2-4 provide distinct advantages over other alternatives.

For example, one alternative is a recursive solution that first evaluates only the newly added or changed recording request and then expands the range of the evaluation in successive recursive evaluations by including other requests that have time overlaps with the new request. In each pass of evaluation, the requests with time overlaps are examined with respect to program priorities and resource constraints to determine which requests can or cannot be recorded. This evaluation process is repeated until a situation is reached, in which no additional schedule changes (compared to the previous round) are required. This approach can be fast in some cases, but in cases where many rounds of recursive evaluations are required, it can be very slow and time-consuming.

Another alternative is to iterate over the entire schedule and effectively evaluate every entry in the prioritized schedule as to whether there is sufficient resource to record the particular requested program (i.e., perform the inquiry as in box 404 of FIG. 4). This is slow because every entry in the schedule will have to be examined, even if only a few entries may need to be changed.

Compared to these alternatives, the method of the present invention provides an improved or more efficient solution by first reducing the set of data that must be analyzed or evaluated, prioritizing the reduced data set, and performing the analysis on the prioritized, reduced data set.

This method provides improved performance because it is readily adaptable to changes in complex conflict scenarios. In a real-life system, determining if an actual conflict exists can depend on many different factors such as tuner availability, available disk space, total bit-rate of requested channels, among others. The criteria used to determine if a true conflict exists may also vary based on implementation or even based on the service provider. In this invention, the decision making regarding whether a true conflict exists based on resource availability is isolated to box 404 in FIG. 4. All other steps in FIGS. 3-4 are always the same, regardless of any specific resource constraints that may be imposed by a particular hardware platform or service provider. This makes it easy to apply the design to multiple hardware platforms and multiple service providers because the only part of the implementation that may need to be customized for a particular hardware device or service provider is the evaluation done in step 404. By isolating this evaluation to box 404, it is possible to implement a generic solution that will work for many different service providers in many different set top box designs without substantial modifications.

The various embodiments disclosed herein can be implemented as hardware, firmware, software executed by a processor, controller or machine, or any combination thereof. Moreover, the software is preferably implemented as an application program tangibly embodied on a program storage unit or non-transitory computer readable medium (e.g., hard drive, removable storage, read-only memory, random accessible memory, among others), to be uploaded to, and executed by, a machine comprising any suitable architecture. In one embodiment, program instructions are stored in the computer readable medium such that, when executed by one or more processors, will cause a method of the present invention to be implemented as discussed above. Preferably, the machine is implemented on a computer platform having hardware such as one or more central processing units ("CPUs"), a memory, and input/output interfaces. The computer platform may also include an operating system and microinstruction code. Various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The block diagrams in the different embodiments illustrate the architecture, functionality, and/or operation of some possible implementations of apparatus and methods. It will be understood that various modifications can be made. For example, one or more elements may be combined, supplemented, modified, or removed to produce other implementations. In some cases, one or more functions may occur in different orders from those shown in the figures. Accordingly, these and other implementations are contemplated by this application and are within the scope of the following claims.

The invention claimed is:

1. A method for processing requests for content recording, comprising:

providing a prioritized reduced set of recording requests from a total number of pending recording requests, wherein each recording request in the prioritized reduced set has a time overlap with at least one other recording request in the prioritized reduced set, and the prioritized reduced set has fewer recording requests than the total number of pending recording requests;

analyzing a prioritized set with respect to resource constraints to identify recording requests to be excluded from a recording schedule;
scheduling requests for recording based on results of the analysis;
recording content according to scheduled requests and
evaluating a recording request from the prioritized reduced set with respect to the resource constraints;
adding the recording request to a first list if there is sufficient resource to fulfill the recording request, and adding the recording request to a second list if there is insufficient resource to fulfill the recording request; and
repeating the evaluating a request and adding the recording steps for all other recording requests in an order of decreasing priority in the prioritized set;
wherein the evaluating step is performed based on resources allocated to recording requests in the first list that have a time overlap with the recording request in the prioritized reduced set.

2. The method of claim 1, wherein the prioritized reduced set of recording requests is produced by:
generating a first set of recording requests by including, for each recording request: an identifier, a start and end time, a service identifier, and a priority;
joining the first set with itself for recording requests having different service identifiers;
generating a second set from the joined first set of recording requests by including all recording requests with time overlaps; and
ordering the second set based on priorities of the recording requests.

3. The method of claim 1, wherein the resource constraints include hardware components, bandwidth and service-related constraints.

4. The method of claim 1, wherein the prioritized set is produced based on priorities assigned by a user.

5. A non-transitory computer readable medium comprising instructions that, when executed by a processor, causes a process to be performed, the process comprising:
providing a prioritized reduced set of recording requests from all pending recording requests, each recording request in the prioritized set having a time overlap with at least one other recording request;
analyzing the prioritized reduced set with respect to resource constraints to identify recording requests to be excluded from a recording schedule;
scheduling requests for recording based on results of the analysis;
recording content according to scheduled requests and
evaluating a recording request from the prioritized set with respect to the resource constraints;
adding the recording request to a first list if there is sufficient resource to fulfill the recording request, and adding the recording request to a second list if there is insufficient resource to fulfill the recording request; and
repeating the evaluating a recording and adding the recording steps for all other recording requests in an order of decreasing priority in the prioritized reduced set;
wherein the evaluating step is performed based on resources allocated to recording requests in the first list that have a time overlap with the recording request in the prioritized reduced set.

6. The method of claim 1, wherein the resource constraints include hardware components, bandwidth and service-related constraints.

7. The method of claim 1, wherein the prioritized reduced set is produced based on priorities assigned by a user.

8. A video recorder, comprising:
an input stream processor;
a controller coupled to the input stream processor; and
a storage device coupled to the controller;
wherein the controller is configured for receiving recording requests, producing a prioritized set of overlapping recording requests from all pending recording requests, and analyzing the prioritized set with respect to resource constraints; and, based on analysis results, identifying recording requests to be excluded from a recording schedule; and
wherein the controller is further configured to performing the analyzing step by:
(a) evaluating a recording request from the prioritized set with respect to the resource constraints;
(b) adding the recording request to a first list if there is sufficient resource to fulfill the recording request, and adding the recording request to a second list if there is insufficient resource to fulfill the recording request; and
repeating steps (a) and (b) for all other recording requests in an order of decreasing priority in the prioritized set;
wherein the evaluating step is performed based on resources allocated to recording requests in the first list that have a time overlap with the recording request in the prioritized reduced set.

9. The video recorder of claim 8, wherein the controller is further configured for producing the prioritized set of recording requests by:
generating a first set of recording requests by including, for each recording request: an identifier, a start and end time, a service identifier, and a priority;
joining the first set with itself for recording requests having different service identifiers;
generating a second set from the joined first set of recording requests by including all recording requests with time overlaps; and
ordering the second set based on priorities of the recording requests.

10. The video recorder of claim 9, wherein the resource constraints include hardware components, bandwidth and service-related constraints.

11. The video recorder of claim 8, wherein the resource constraints include hardware components, bandwidth and service-related constraints.

12. The video recorder of claim 8, wherein the prioritized reduced set is produced based on priorities assigned by a user.

13. The video recorder of claim 8, wherein the prioritized reduced set is produced based on priorities assigned by a user.

14. The method of claim 5, wherein the resource constraints include hardware components, bandwidth and service-related constraints.

15. The non-transitory computer readable medium of claim 5, wherein the prioritized reduce set of recording requests is produced by:
generating a first set of recording requests by including, for each recording request: an identifier, a start and end time, a service identifier, and a priority;
joining the first set with itself for recording requests having different service identifiers;
generating a second set from the joined first set of recording requests by including all recording requests with time overlaps; and
ordering the second set based on priorities of the recording requests.

* * * * *